(No Model.)

R. S. HARRELL.
PLOW ATTACHMENT.

No. 601,016. Patented Mar. 22, 1898.

Witnesses
Jas. C. Stack
Victor J. Evans

Inventor
Robert S. Harrell
By John Wedderburn.
Attorney

UNITED STATES PATENT OFFICE.

ROBERT S. HARRELL, OF JOHNSON GROVE, TENNESSEE.

PLOW ATTACHMENT.

SPECIFICATION forming part of Letters Patent No. 601,016, dated March 22, 1898.

Application filed April 26, 1897. Serial No. 633,973. (No model.)

*To all whom it may concern:*

Be it known that I, ROBERT S. HARRELL, a citizen of the United States, residing at Johnson Grove, in the county of Crockett and State of Tennessee, have invented certain new and useful Improvements in Plow Attachments; and I do hereby declare the following to be a full, clear, and exact description of the invention, such as will enable others skilled in the art to which it appertains to make and use the same.

This invention relates to plow attachments; and it consists, essentially, of a movable device for preventing the plowshare from becoming choked and also of the details of construction and arrangement of the several parts, which will be more fully hereinafter described and claimed.

The object of the present invention is to provide simple and effective means for clearing a plowshare while in operation without requiring a cessation of the movements of the draft animals or animal, the simplicity of the attachment rendering it easily applicable to plows now in use without requiring rearrangement of parts of the plow to accommodate the same.

Figure 1:
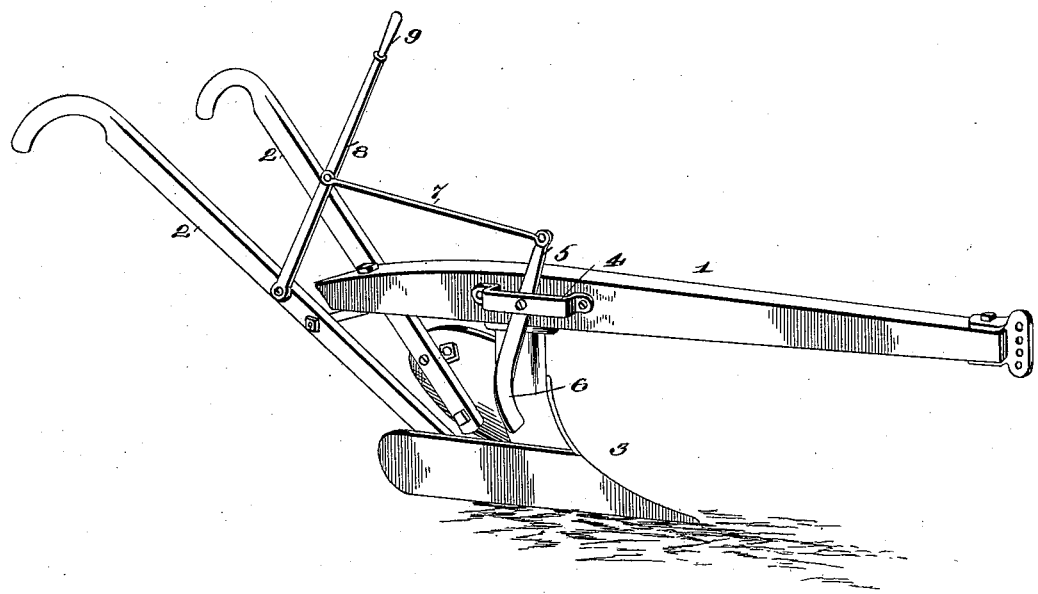
Figure 2:
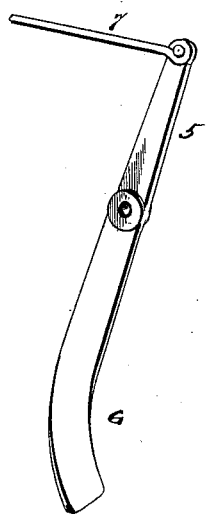

In the accompanying drawings, Figure 1 is a perspective view of the plow, showing the improved attachment applied thereto. Fig. 2 is a detail perspective view of the attachment disconnected.

Referring to the drawings, wherein similar numerals of reference are employed to indicate corresponding parts in both views, the numeral 1 designates a plow-beam having suitable handles 2 and a share 3 of any preferred form of construction. To one side of the plow-beam 1 and at a point over the plowshare is secured an elongated plate 4, in which is pivotally mounted an arm 5, having the lower angularly-bent or inturned end 6, which is adapted to move over and clear the front of the plow of trash or debris which may gather thereon in plowing through land having a rank growth. To the upper end of said arm 5 is movably attached the outer end of a connecting-rod 7 and at its rear end is pivotally secured to an intermediate portion of an operating-lever 8. The said operating-lever has its lower end pivotally attached to one of the handle-bars 2, and its free end is formed with a suitable grip or handle 9. The lower end 6 of the arm 7 is provided with a slight torsional twist, which will bring a broad bearing-surface against the material which may collect on the plowshare, and by giving the operating-lever a quick jerk the collected material can be readily thrown off, thus relieving the plow of a drag or increasing the resistance offered to the draft.

The attachment as set forth can be readily applied to plows now in use at a minimum expense, which is overcome by the additional facilities and conveniences provided by the use of the device.

It is obviously apparent that many minor changes in the details of construction and arrangement of the several parts might be made and substituted for those shown and described without in the least departing from the nature or spirit of the invention.

Having thus described the invention, what is claimed as new is—

In a plow attachment, the combination with a plow-beam, of an arm pivotally attached thereto and having its flat side bearing thereagainst, the lower end of said arm being broadened and curved and extending inward toward the plowshare in a plane at right angles to the body portion of the said arm to present a broad pushing-surface movable in a plane parallel with the line of draft, a connecting-rod attached to the upper end of said arm, and a lever pivotally attached to one of the plow-handles and to the end of the said connecting-rod, substantially as described.

In testimony whereof I have signed this specification in the presence of two subscribing witnesses.

ROBERT S. HARRELL.

Witnesses:
A. W. TAYLOR,
R. H. MITCHELL.